(12) United States Patent
Chen et al.

(10) Patent No.: US 7,440,015 B2
(45) Date of Patent: Oct. 21, 2008

(54) GAMMA CORRECTION METHOD AND SYSTEM

(75) Inventors: Li-Ming Chen, Keelung City (TW); Cheng-Yu Wu, Hsinchu City (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 547 days.

(21) Appl. No.: 11/295,660

(22) Filed: Dec. 7, 2005

(65) Prior Publication Data

US 2006/0244849 A1 Nov. 2, 2006

(30) Foreign Application Priority Data

Apr. 13, 2005 (TW) .............................. 94111625 A (51) Int. Cl.
*H04N 5/202* (2006.01)
(52) U.S. Cl. ..................... 348/254; 348/255; 348/256
(58) Field of Classification Search ................ 348/254, 348/674–675, 690, 721, 255–257; 382/254
See application file for complete search history.

(56) References Cited

U.S. PATENT DOCUMENTS

| | | | |
|---|---|---|---|
| 5,408,267 A | 4/1995 | Main ........................ 348/254 |
| 5,473,372 A | 12/1995 | Nobuoka et al. ............ 348/254 |
| 6,166,781 A * | 12/2000 | Kwak et al. ................ 348/674 |
| 6,697,127 B2 * | 2/2004 | Suzuki ....................... 348/674 |
| 6,791,576 B1 * | 9/2004 | Lin ............................ 345/690 |

* cited by examiner

*Primary Examiner*—Lin Ye
*Assistant Examiner*—Mekonnen Dagnew
(74) *Attorney, Agent, or Firm*—Bacon & Thomas, PLLC (57) ABSTRACT

A gamma correction method and system, which performs a gamma correction on an n-bit video signal to thus generate a gamma correction value. At first, a first primary index and a first sub-index are obtained by performing an index mapping on a value of the video signal. Next, a first gamma value is obtained by performing a table lookup on the first primary index and the first sub-index. Next, a second primary index and a second sub-index are obtained by performing the index mapping on the first gamma value. Next, multiple thresholds are obtained by performing the table lookup on the second primary index and the second sub-index. Finally, the value of the video signal and the multiple thresholds are compared to accordingly correct the first gamma value and generate the gamma correction value.

22 Claims, 10 Drawing Sheets

$$main.index = fix\left[\frac{InputValue}{8}\right]$$

$$sub.index = InputValue - fix\left[\frac{InputValue}{8}\right] \times 8$$

$Sum = 0$
$for \quad i = 0 : sub.index$
$\quad Sum + = LUT[main.index][sub.index]$
$end$
$OutputValue = Sum$

GAMMA CORRECTION METHOD AND SYSTEM

BACKGROUND OF THE INVENTION

1. Field of the Invention

The invention relates to the technical field of gamma correction and, more particularly, to a gamma correction system and method using lookup table.

2. Description of Related Art

Typically, a color image processing system is composed of an image sensor, an image recovery and processing unit, an image display and an image compressor. The image capture unit changes light intensity signals sensed by an image sensor into electronic signals to form an image signal. Since there exists a non-linearity between the light intensity signal and the electronic signal, and the electronic signal needs more bit number for higher resolution than that for the units in the post stage, the image signal needs to perform a resolution conversion before entering in the post-stage units. Thus, gamma correction is used to compensate the non-linearity and change the signal from high to low bit number, i.e., from high to low resolution.

U.S. Pat. No. 5,408,267 granted to Main for a "Method and apparatus for gamma correction by mapping, transforming and de-mapping" discloses a gamma correction curve that is divided into multiple consecutive segments with a $$\frac{1}{a}$$

reduced scale by input ranges, in which all segments are mapped to a standard segment for generating a gamma correction value through a gamma corrector with respect to the standard segment, and the gamma correction value is de-mapped to a substantial gamma correction value. Because the gamma correction curves have different slopes for each segment, such a segment mapping may cause a great error. U.S. Pat. No. 5,473,372 granted to Nobuoka, et al. for a "Gamma correction circuit approximating non-linear digital conversion" provides a gamma correction curve that is approached by several linear segments with different slopes. However, such a linear approach may also cause a significant error.

Figure 1A:
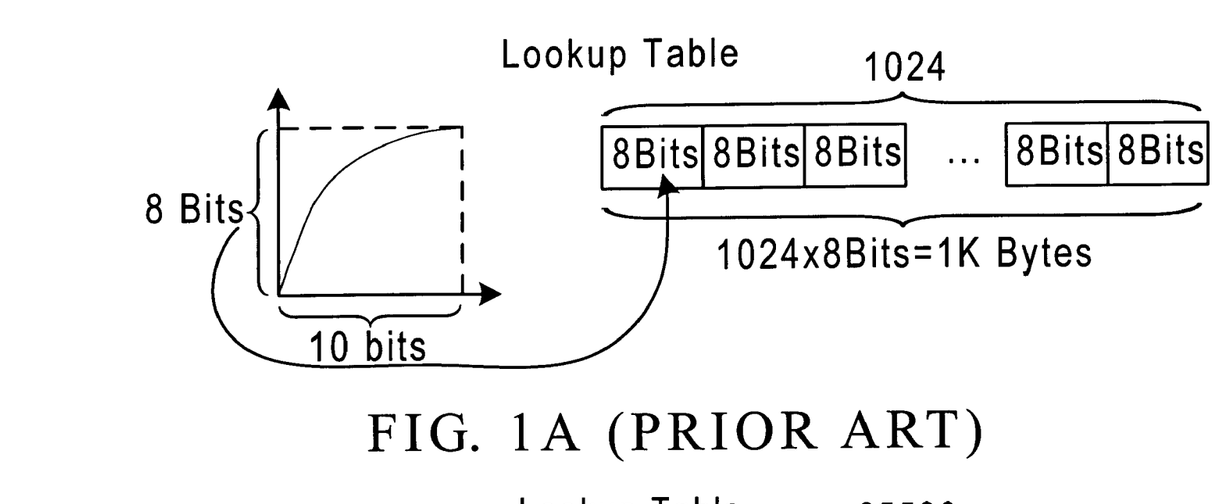
FIG. 1A is a schematic view of a typical gamma correction of converting 10 bits into eight bits.
Figure 1B:
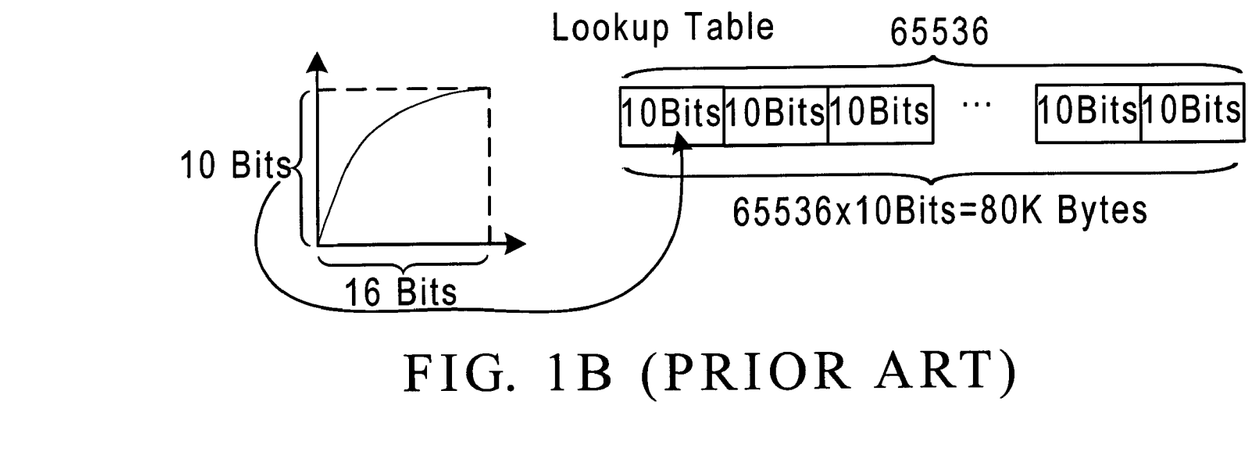
FIG. 1B is schematic view of a typical gamma correction of converting 16 bits into 10 bits.

To overcome this, a typical technique using a lookup table scheme to reduce the significant error is proposed. FIG. 1A is a schematic view of a gamma correction of converting ten bits into eight bits, which requires a 1K-byte storage space. FIG. 1B is schematic view of a gamma correction of converting 16 bits into 10 bits, which requires an 80K-byte storage space.

Figure 2:
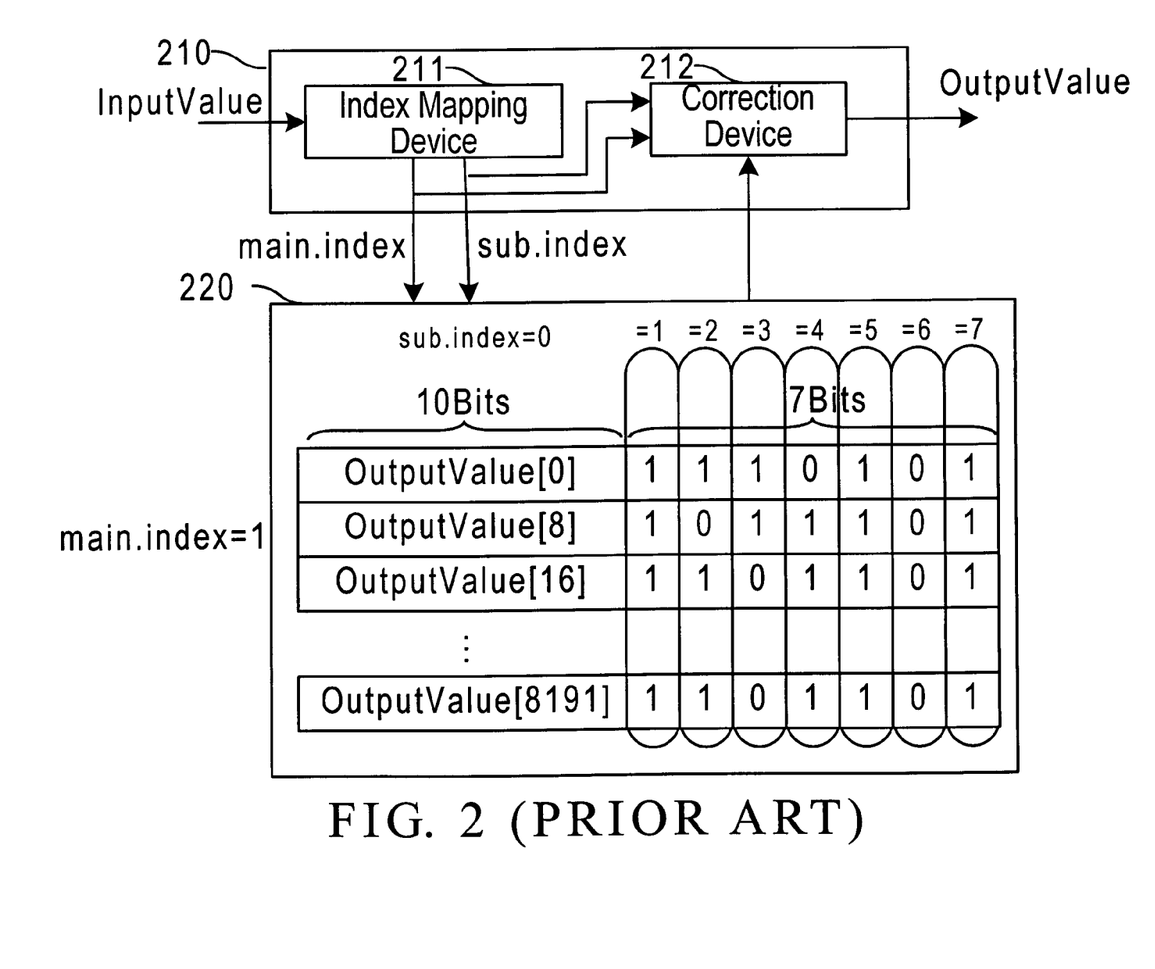
FIG. 2 is a schematic view of a typical scheme using a compressed lookup table.
Figure 3A:
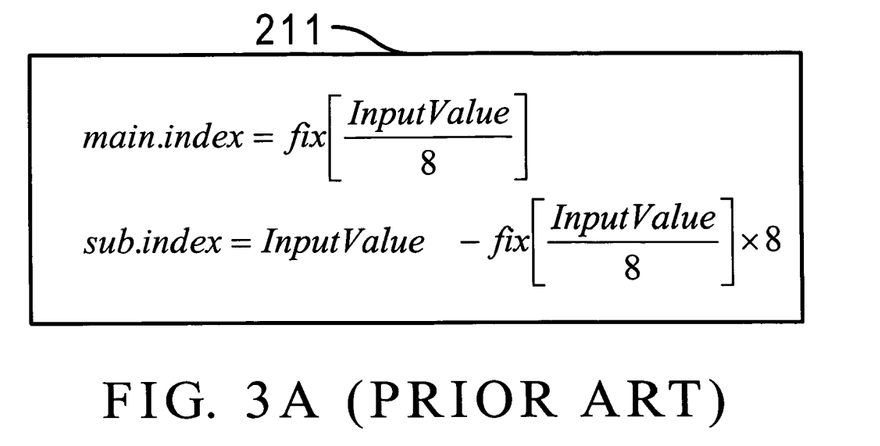
FIG. 3A is a schematic view of pseudo codes of a typical index mapping device.
Figure 3B:
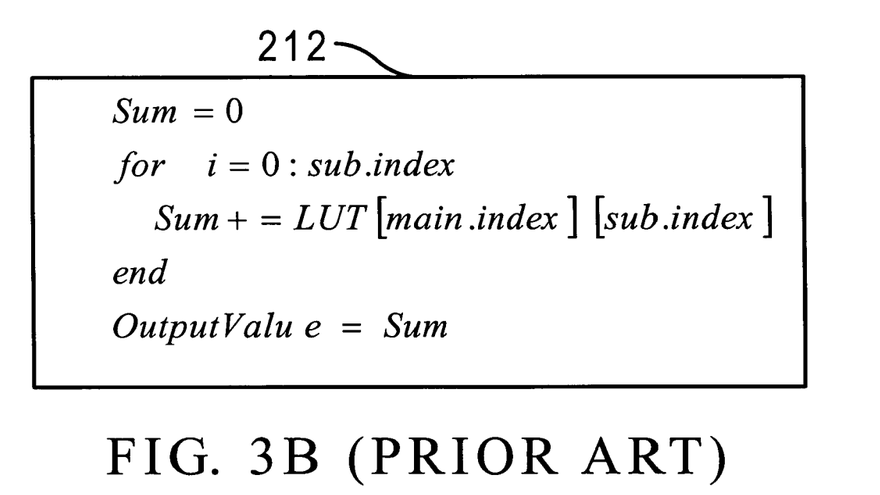
FIG. 3B is a schematic view of pseudo codes of a typical correction device.

It is known that such a lookup table scheme requires a large storage space. To overcome this, FIG. 2 is a schematic view of a typical scheme using a compressed lookup table, which includes a lookup engine 210 and a lookup table 220. The lookup engine 210 has an index mapping device 211 and a correction device 212. FIG. 3A is a schematic view of pseudo codes of the index mapping device 211, where fix[ ] is a floor operator, and fix[v] is, an integer, the closest to v and smaller than or equal to v, for example, fix[2.8]=fix[2.1]=2. FIG. 3B is a schematic view of pseudo codes of the correction device 212. When an input value, denoted as InputValue, equals to ten, the lookup engine 210 outputs a variable main.index with value as one and a variable sub.index with value as two to the lookup table 220 for reading three elements LUT[1][0], LUT[1][1] and LUT[1][2] of the lookup table 220. The element LUT[1][0] stores a 10-bit output value OutputValue[8] and each of the elements LUT[1][1] and LUT[1][2] is a 1-bit output value. The correction device 212 in FIG. 3B adds the elements LUT[1][0], LUT[1][1] and LUT[1][2] to generate a corresponding output value (OutputValue). When converting 16 bits into 10 bits, the lookup table 220 has a size reduced from 80K to 17K bytes ((65536/8)×17 bits=17K bytes). However, for a system-on-chip (SoC) design, it still occupies a lot of gate counts. Therefore, it is desirable to provide an improved gamma correction system and method to mitigate and/or obviate the aforementioned problems.

SUMMARY OF THE INVENTION

The object of the invention is to provide a gamma correction system and method, which can avoid the prior error and reduce the large storage space.

In accordance with one aspect of the present invention, there is provided a gamma correction method. The method performs a gamma correction on an n-bit video signal to thus generate a gamma correction value. The method includes a virtual index computation step, a first primary index and first sub-index computation step, a first gamma construction step, a second primary index and second sub-index computation step, a multi-threshold generation step and a correction step. The virtual index computation step obtains a virtual index by dividing a value of the n-bit video signal by a first constant and accordingly performing a floor operation, and then adding a second constant. The first primary index and first sub-index computation step obtains a first primary index by dividing the virtual index by a third constant and accordingly performing the floor operation, and a first sub-index by multiplying the first primary index by the third constant to thus generate a first inter-median and then subtracting the first inter-median from the virtual index. The first gamma construction step uses the first primary index and the first sub-index to construct a first gamma value. The second primary index and second sub-index computation step obtains a second primary index by dividing the first gamma value by a fourth constant and accordingly performing the floor operation, and a second sub-index by multiplying the second primary index by the fourth constant to thus generate a second inter-median and subtracting the second inter-median from the first gamma value. The multi-threshold generation step uses the second primary index and the second sub-index to construct multiple thresholds. The correction step compares the value of the n-bit video signal with the thresholds for correcting the first gamma value and thus generating the gamma correction value.

In accordance with another aspect of the present invention, there is provided a gamma correction method. The method performs a gamma correction on an n-bit video signal for generating a gamma correction value. The method includes the steps: (A) generating a virtual index by performing a first index mapping on a value of the n-bit video signal, and respectively generating a first primary index and a first sub-index by performing a second index mapping on the virtual index; (B) constructing a first gamma value by using the first primary index and the first sub-index; (C) respectively generating a second primary index and a second sub-index by performing a third index mapping on the first gamma value; (D) constructing multiple thresholds by using the second primary index and the second sub-index; (E) correcting the first gamma value by comparing the value of the n-bit video signal with the thresholds, thereby generating the gamma correction value.

In accordance with a further aspect of the present invention, there is provided a gamma correction system. The system performs a gamma correction on an n-bit video signal for generating a gamma correction value. The system includes a first index generator, a first gamma generator, a second index generator, a multi-threshold generator and a correction device. The first index generator has a first index mapping device and a second index mapping device. The first index mapping device receives a value of the n-bit video signal to thus generate a virtual index, and the second index mapping device receives the virtual index to thus generate a first primary index and a first sub-index respectively. The first gamma generator is connected to the first index generator such that a first gamma value is constructed by the first primary index and the first sub-index. The second index generator is connected to the first gamma generator such that performing an index mapping on the first gamma value respectively generates a second primary index and a second sub-index. The multi-threshold generator is connected to the second index generator such that multiple thresholds are constructed by the second primary index and the second sub-index. The correction device is connected to the first gamma generator and the multi-threshold generator such that the value of the n-bit video signal and the thresholds are compared to accordingly correct the first gamma value and generate the gamma correction value.

Other objects, advantages, and novel features of the invention will become more apparent from the following detailed description when taken in conjunction with the accompanying drawings.

DETAILED DESCRIPTION OF THE PREFERRED EMBODIMENT

Figure 4:
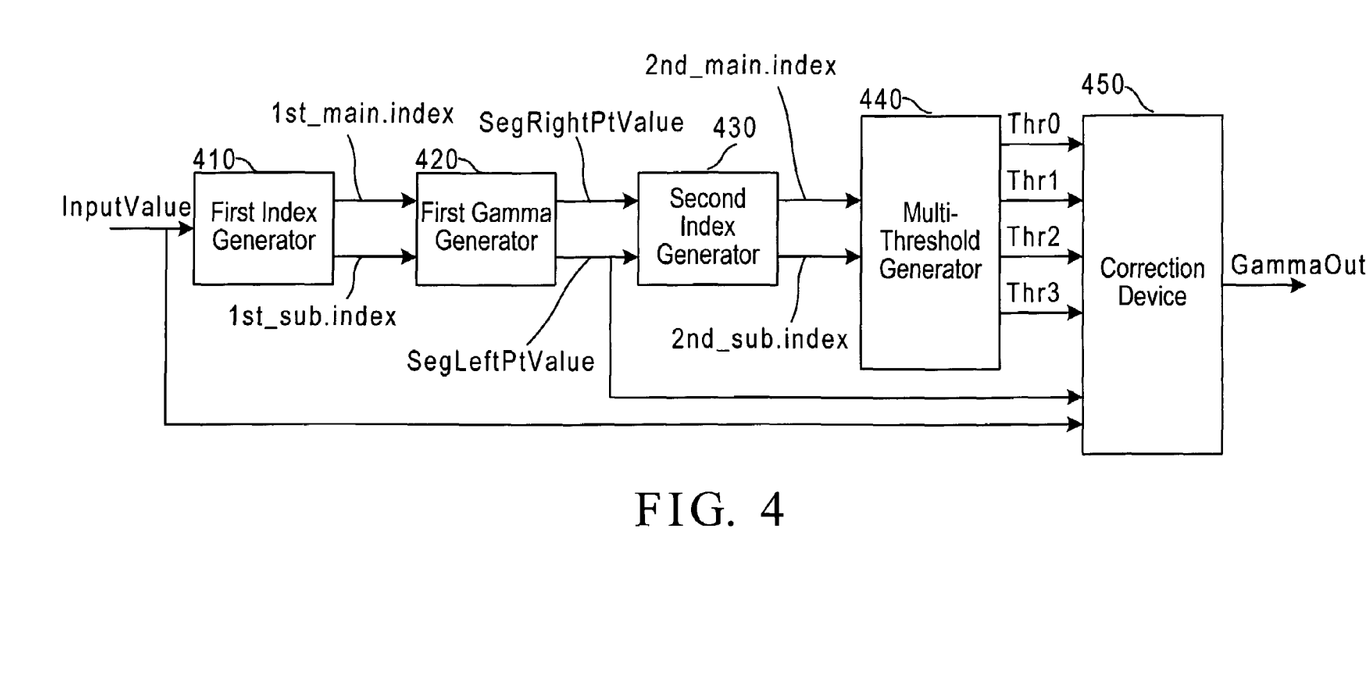
FIG. 4 is a block diagram of a gamma correction system in accordance with the invention.

FIG. 4 is a block diagram of a gamma correction system in accordance with the invention, which performs a gamma correction on an n-bit video signal for generating a gamma correction value. The system includes a first index generator 410, a first gamma generator 420, a second index generator 430, a multi-threshold generator 440 and a correction device 450.

The first index generator 410 has a first index mapping device 411 and a second index mapping device 412. The first index mapping device 411 receives the n-bit video signal InputValue to accordingly generate a virtual index Virtual.Index. For illustrative purpose, a 16-bit video signal is employed in the following description (n=16). The virtual index passes through the second index mapping device 412 to thus generate a first primary index 1st_main.index and a first sub-index 1st_sub.index, respectively.

Figure 5:
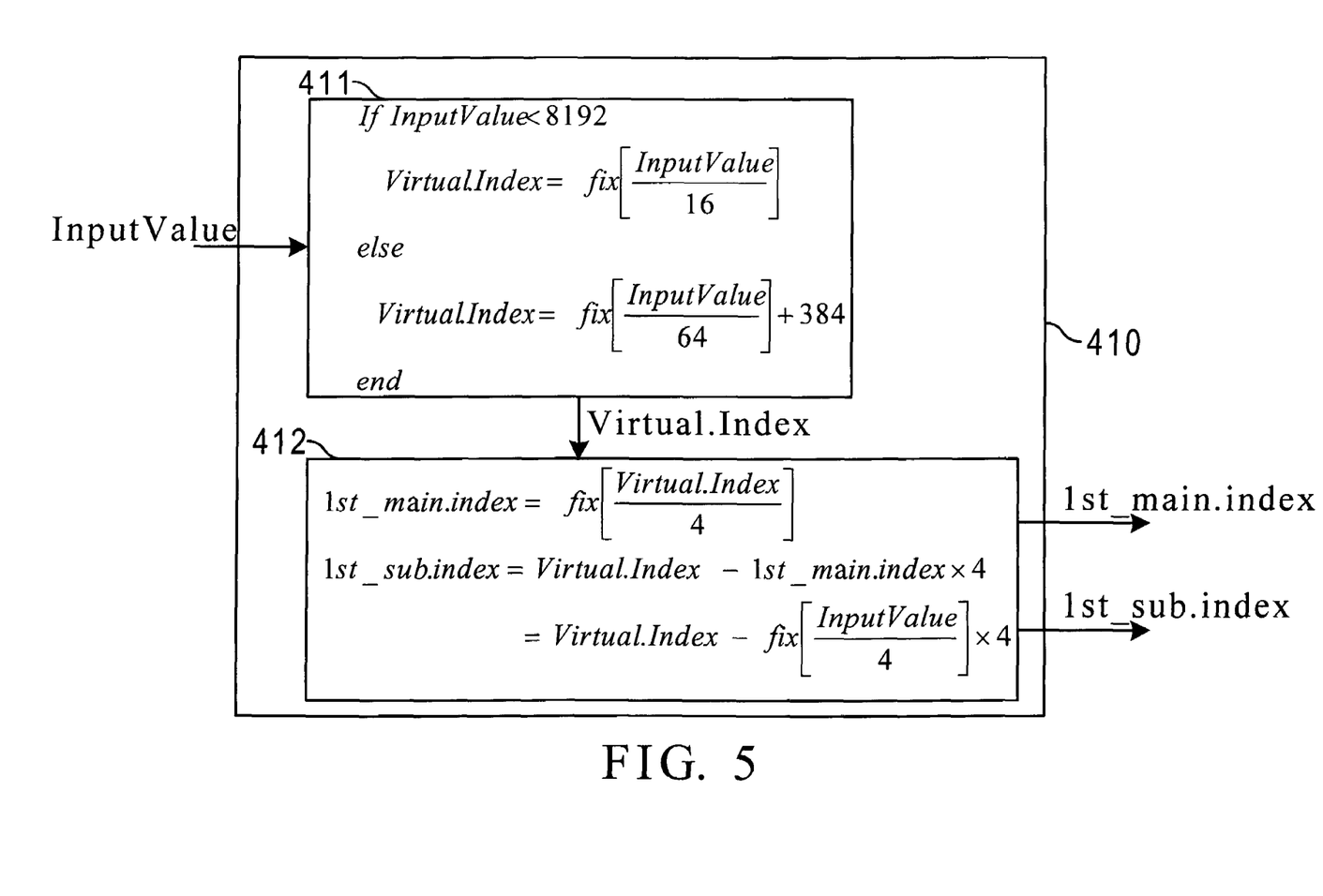
FIG. 5 is a schematic view of a first index generator in accordance with the invention.

FIG. 5 is a schematic view of the first index generator 410 in accordance with the invention. The first index mapping device 410 is implemented by the following pseudo codes:

```
If InputValue < 8192
    Virtual.Index = fix[InputValue/16]
Else
    Virtual.Index = fix[InputValue/64] + 384,
``` where InputValue is a value of the video signal, Virtual.Index is the virtual index corresponding to the value, and fix[ ] is a floor operation. The second index mapping device 412 is implemented by the following pseudo codes:

```
1st_main.index = fix[Virtual.Index/4]
1st_sub.index = Virtual.Index − (1st_main.index × 4),
``` where 1st_main.index is the first primary index, and 1st_sub.index is the first sub-index. A hardware description language, such as Verilog, VHDL or SystemC, can implement the pseudo codes of the first and second index mapping devices 411 and 412.

As shown in FIG. 5, when the InputValue is smaller than 8192, the InputValue is divided by 16 and then performed with a floor operation to obtain the Virtual.Index. When the InputValue is greater than or equal to 8192, the InputValue is divided by 64, added with a value of 384 and then performed with a floor operation to obtain the Virtual.Index. The Virtual.Index is divided by 4 and then performed with a floor operation to obtain the 1st_main.index. The 1st_main.index is multiplied by 4 to generate a first inter-median, and the 1st_sub.index is generated by subtracting the first inter-median from the Virtual.Index.

Accordingly, when the value of the n-bit video signal equals to 57563, it is able to determine that the Virtual.Index is 1283, the 1st_main.index is 320, and the 1st_sub.index is 3 according to the pseudo codes shown in FIG. 5.

Figure 6:
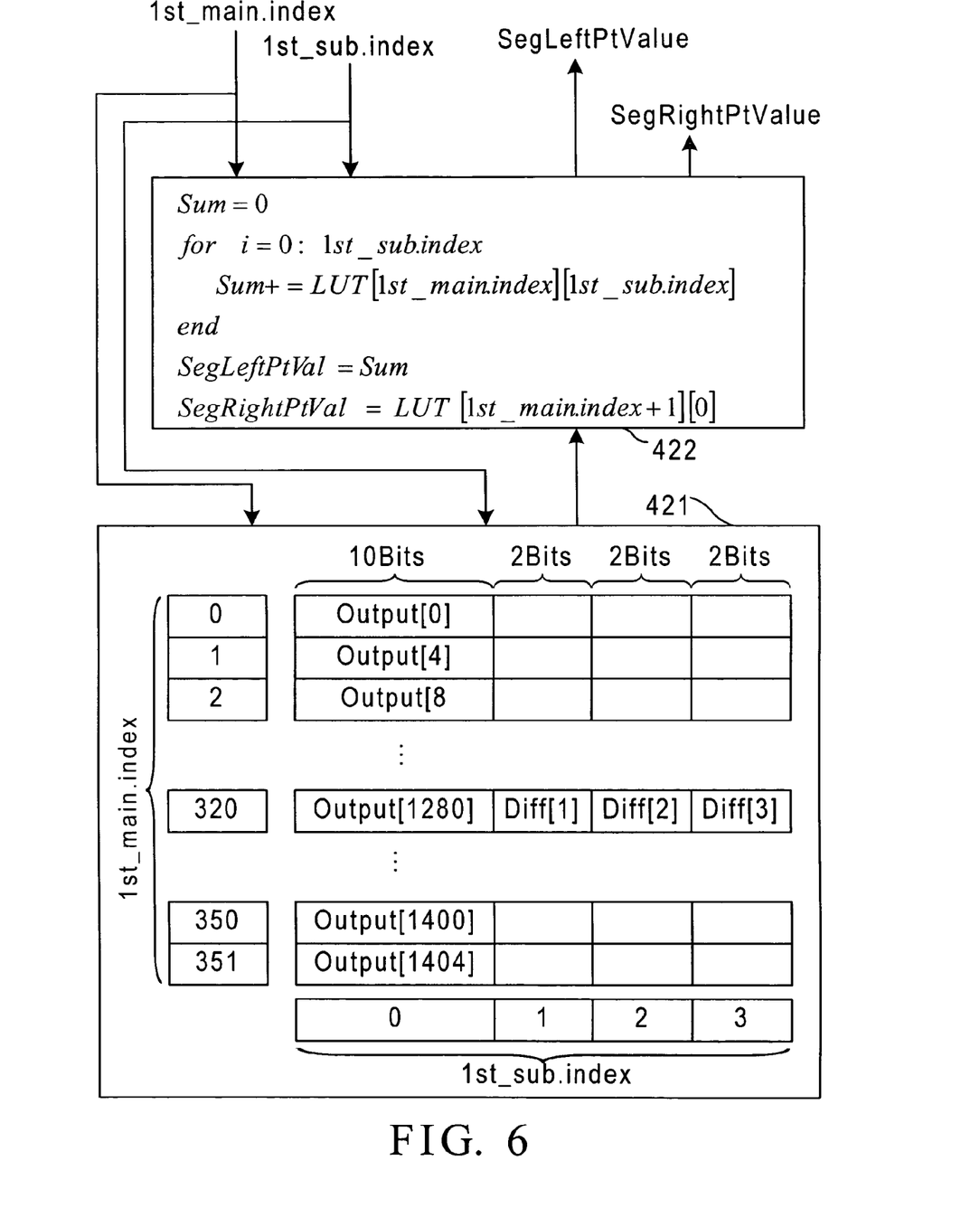
FIG. 6 is a schematic view of a first gamma generator in accordance with the invention.

FIG. 6 is a schematic view of the first gamma generator 420 in accordance with the invention. The first gamma generator 420 is connected to the first index generator 410 such that a first gamma value SegLeftPtValue is constructed by the first primary index 1st_main.index and the first sub-index 1st_sub.index. The first gamma generator 420 has a first lookup table 421 and a first computation device 422. The first computation device 422 is implemented by the following pseudo codes:

```
Sum = 0
for i = 0: 1st_sub.index
    Sum+ = LUT [1st_main.index][1st_sub.index]
end
```

```
SegLeftPtVal = Sum
SegRightPtVal = LUT [1st_main.index + 1][0],
``` where SegLeftPtValue is a first gamma value, SegRightPtValue is a second gamma value, and LUT[ ][ ] represents elements of the first lookup table 421.

When the 1st_main.index equals to 320 and the 1st_sub.index equals to 3, the first computation device 422 reads the elements LUT[320][0], LUT[320][1], LUT[320][2] and LUT[320][3] of the first lookup table 421. The element LUT[320][0] stores a 10-bit data Output[1280], and the elements LUT[320][1], LUT[320][2] and LUT[320][3] store 2-bit data Diff[1], Diff[2] and Diff[3] respectively. The first computation device 422 adds the LUT[320][0], LUT[320][1], LUT[320][2] and LUT[320][3] together to generate the first gamma value SegLeftPtValue.

The first computation device 422 also reads an element LUT[321][0] of the first lookup table 421 as the second gamma value SegRightPtValue. For the 1st_main.index=320 and the 1st_sub.index=3, the SegLeftPtValue (=1004) and the SegRightPtValue (=1007) are obtained through the first computation device 422 and the first lookup table 421. Thus, the gamma correction value substantially output (Gammaout) is between the first and second gamma values, i.e., 1004≦GammaOut≦1007.

Figure 7:
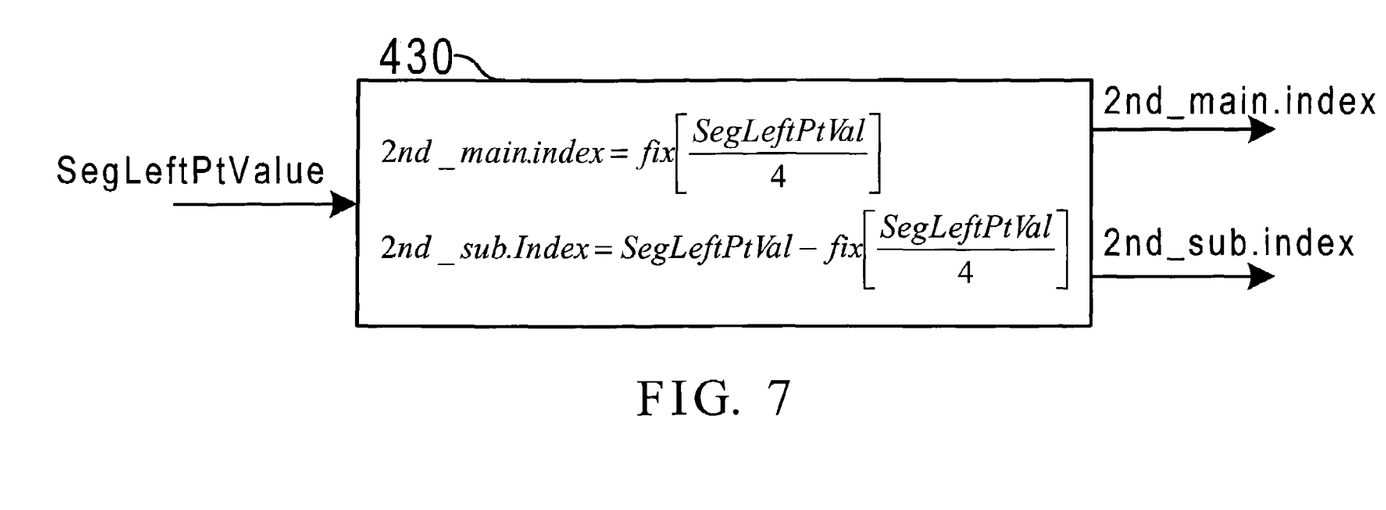
FIG. 7 is a schematic view of a second index generator in accordance with the invention.

FIG. 7 is a schematic view of the second index generator 430 in accordance with the invention. The second index generator 430 is connected to the first gamma generator 420 to receive the first gamma value and respectively generate a second primary index and a second sub-index. The second index generator 430 is implemented by the following pseudo codes:

$$2\text{nd\_main.index} = \text{fix}\left[\frac{\text{SegLeftPtVal}}{4}\right]$$

$$2\text{nd\_sub.Index} = \text{SegLeftPtVal} - 2\text{nd\_main.index} \times 4,$$

where SegLeftPtValue is a first gamma value, 2nd_main.index is a second primary index, and 2nd_sub.index is a second sub-index. As shown in FIG. 7, the first gamma value is divided by 4 and then performed with a floor operation to obtain the second primary index 2nd_main.index. The second primary index 2nd_main.index is multiplied by 4 to thus obtain a second inter-median, and the sub-index 2nd_sub.index is obtained by subtracting the second inter-median from the first gamma value. Accordingly, when SegLeftPtValue equals to 1004, the 2nd_main.index is 251, and the 2nd_sub.index is 0.

Figure 8:
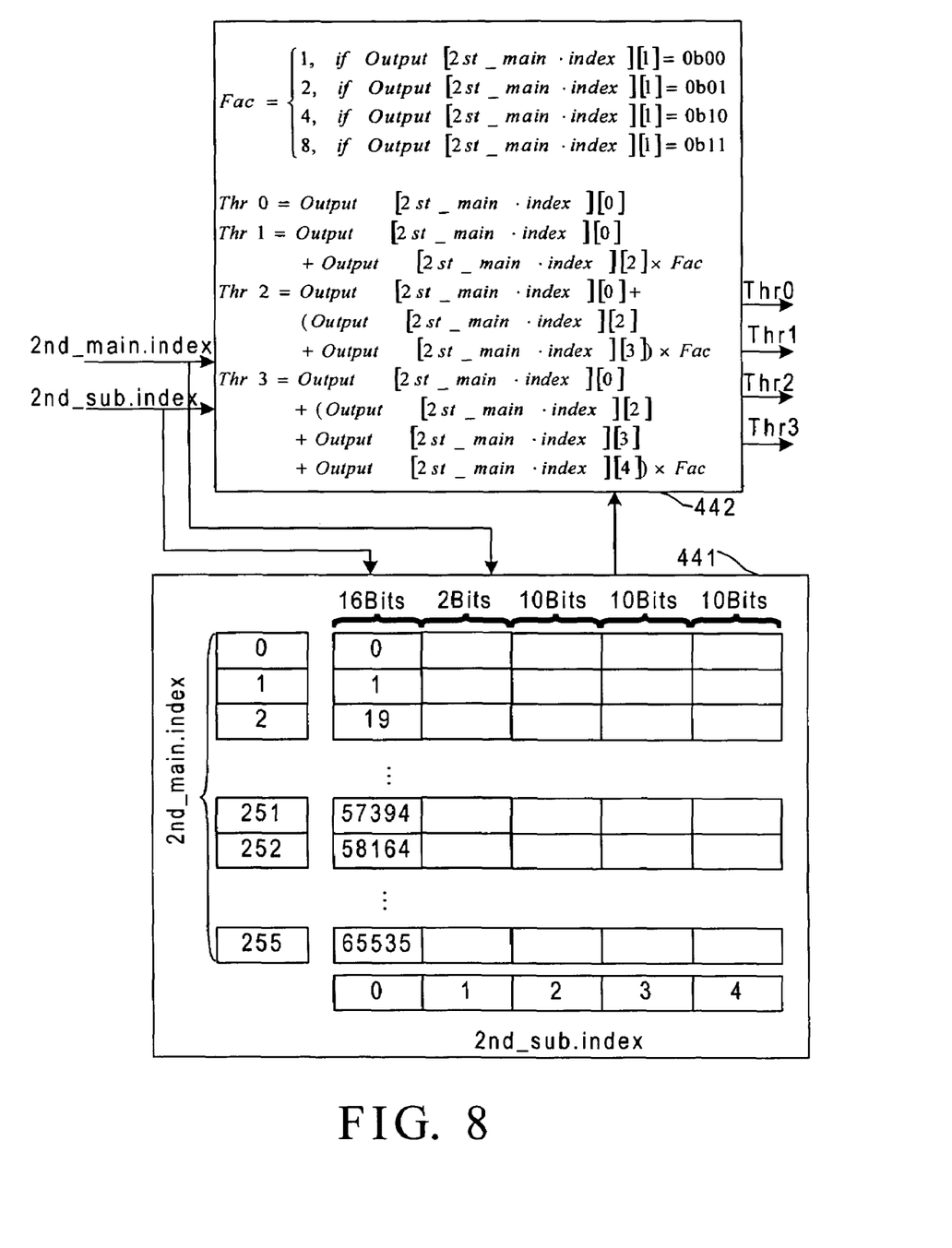
FIG. 8 is a schematic view of a multi-threshold generator in accordance with the invention.

FIG. 8 is a schematic view of the multi-threshold generator 440 in accordance with the invention. The multi-threshold generator 440 is connected to the second index generator 430 such that multiple thresholds are constructed by the second primary index and the second sub-index. The multi-threshold generator 440 has a second lookup table 441 and a second computation device 442. The second computation device 442 is implemented by the following pseudo codes:

$$\text{Fac} = \begin{cases} 1, & \text{if Output [2nd\_main.index][1] = 0b00} \\ 2, & \text{if Output [2nd\_main.index][1] = 0b01} \\ 4, & \text{if Output [2nd\_main.index][1] = 0b10} \\ 8, & \text{if Output [2nd\_main.index][1] = 0b11} \end{cases}$$

Thr0 = Output [2nd_main.index][0]
Thr1 = Output [2nd_main.index][0] + Output [2nd_main.index][2] × Fac
Thr2 = Output [2nd_main.index][0] + (Output [2nd_main.index][2] + Output [2nd_main.index][3]) × Fac
Thr3 = Output [2nd_main.index][0] + (Output [2nd_main.index][2] + Output [2nd_main.index][3] + Output [2nd_main.index][4]) × Fac where Fac is a zoom factor, Thr0 to Thr3 are thresholds, and Output[ ][ ] represents elements of the second lookup table 441.

When 2nd_main.index equals to 251, the second computation device 442 first reads the element Output[251][1] in accordance with the second primary index 2nd_main.index. The zoom fact is one as Output[251][1]=0b00, two as 0b01, four as 0b10, and eight as 0b11. The second computation device 442 sequentially reads the elements Output[251][0], Output[251][2], Output[251][3] and Output[251][4] to compute the first to fourth thresholds Thr0-Thr3 respectively.

Figure 9:
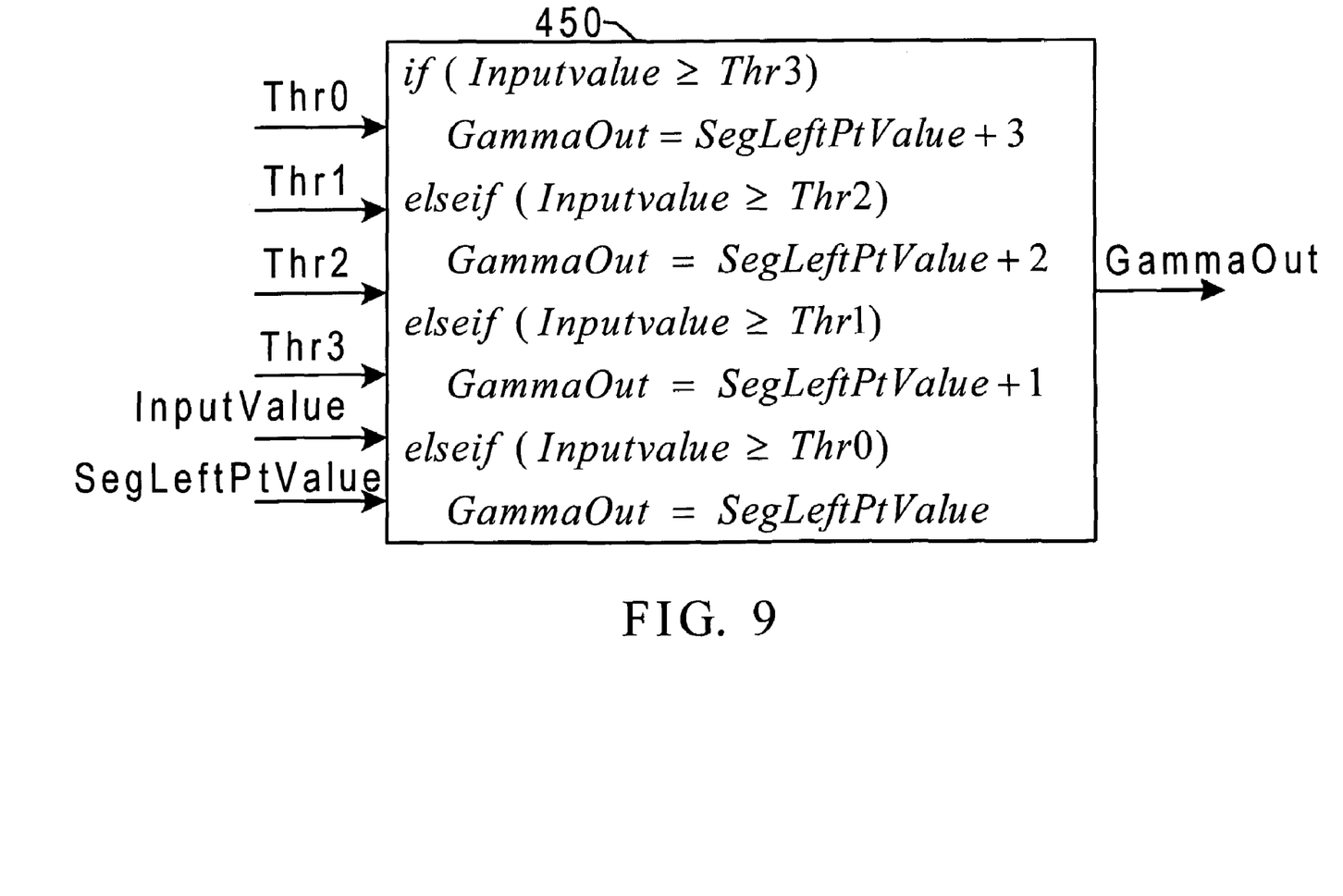
FIG. 9 is a schematic view of a correction device in accordance with the invention.
Figure 10:
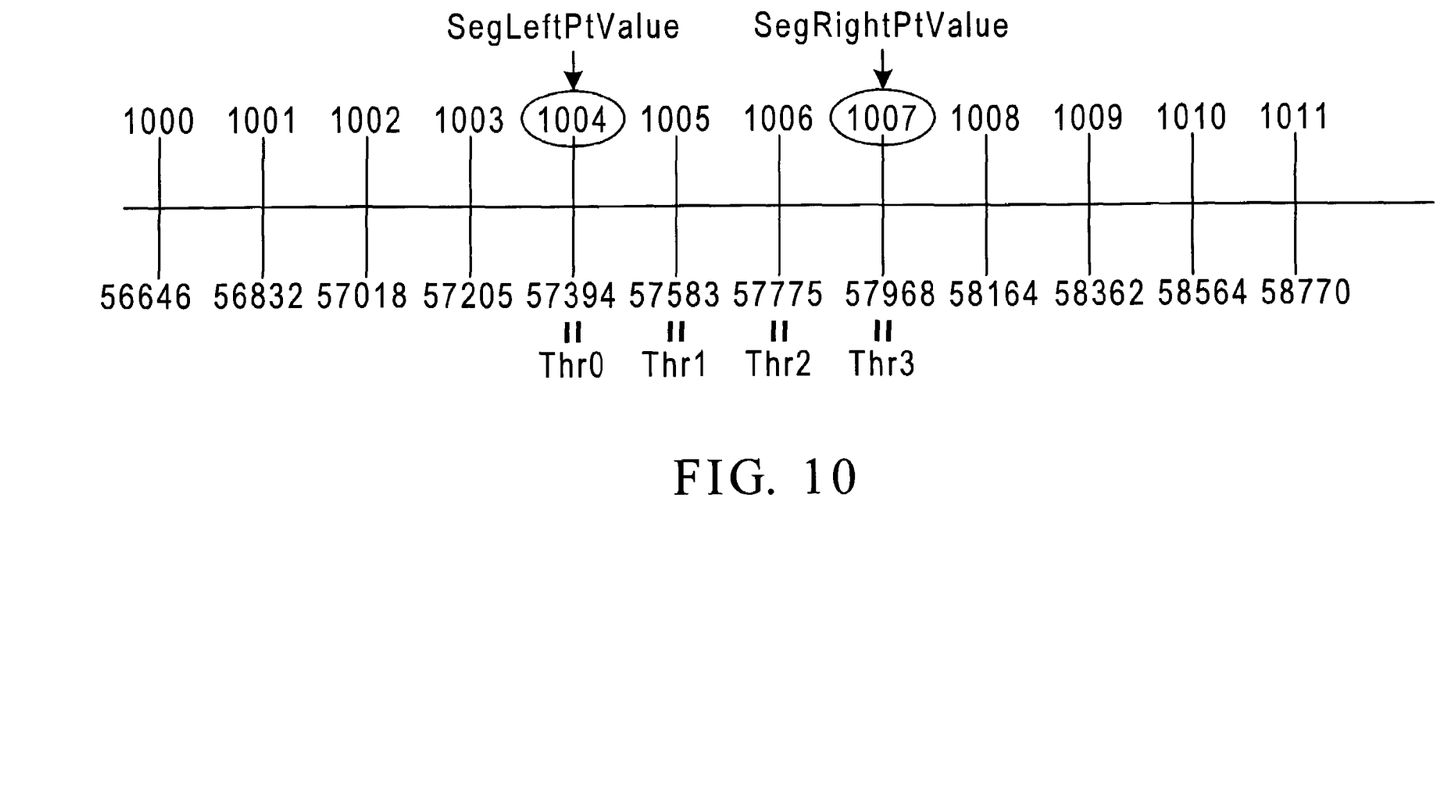
FIG. 10 is a schematic view of an operation of FIG. 9 in accordance with the invention.

FIG. 9 is a schematic view of the correction device 450 in accordance with the invention. The correction device 450 is connected to the first gamma generator 420 and the multi-threshold generator 440 and implemented by the following pseudo codes:

```
if ( Inputvalue ≧ Thr3)
    GammaOut = SegLeftPvValue + 3
elseif ( Inputvalue ≧ Thr2)
    GammaOut = SegLeftPvValue + 2
elseif ( Inputvalue ≧ Thr1)
    GammaOut = SegLeftPvValue + 1
elseif ( Inputvalue ≧ Thr0)
    GammaOut = SegLeftPvValue,
``` where GammaOut is the gamma correction value. The gamma correction value substantially output (GammaOut) is between the first and second gamma values, i.e., 1004≦GammaOut≦1007. FIG. 10 is a schematic view of an operation of FIG. 9 in accordance with the invention. The correction device 450 compares the InputValue with the multiple thresholds Thr0-Thr3, thereby correcting the first gamma value SegLeftPtValue. When the value of the video signal is greater than or equal to the fourth threshold Thr3, the first gamma value is added by three, thereby generating the gamma correction value GammaOut. Similarly, when a value of the video signal is smaller than the fourth threshold Thr3 and greater than or equal to the third threshold Thr2, the first gamma value is added by two, and so on.

As shown in FIGS. 6 and 8, the first lookup table 421 has a size of 702 (351×16/8) bytes, and the second lookup table 441 has a size of 1536 (256×48/8) bytes. Accordingly, the storage space required by the tables 421 and 441 is smaller than 2.5K bytes, which is much smaller than 17K bytes required in the prior art. In addition, the invented multiplication and the division can be achieved by using shift left and right registers. Thus, the logic gates for implementation of multipliers and dividers are reduced dramatically. The second index generator 430, the multi-threshold generator 440 and the correction device 450 can adjust the first gamma value in accordance with the input value to thus precisely obtain the gamma correction value GammaOut.

In view of the foregoing, it is known that a two-stage lookup table scheme is employed in the invention to reduce the numerous errors and further reduce the large storage space required in the prior art.

Although the present invention has been explained in relation to its preferred embodiment, it is to be understood that many other possible modifications and variations can be made without departing from the spirit and scope of the invention as hereinafter claimed.

What is claimed is:

1. A gamma correction method, which performs a gamma correction on an n-bit video signal to thus generate a gamma correction value, the method comprising the steps:
    a virtual index computation step, which obtains a virtual index by dividing a value of the n-bit video signal by a first constant and accordingly performing a floor operation, and adding a second constant;
    a first primary index and first sub-index computation step, which obtains a first primary index by dividing the virtual index by a third constant and accordingly performing the floor operation, and a first sub-index by multiplying the first primary index by the third constant to thus generate a first inter-median and then subtracting the first inter-median from the virtual index;
    a first gamma construction step, which uses the first primary index and the first sub-index to construct a first gamma value;
    a second primary index and second sub-index computation step, which obtains a second primary index by dividing the first gamma value with a fourth constant and accordingly performing the floor operation, and a second sub-index by multiplying the second primary index with the fourth constant to thus generate a second inter-median and then subtracting the second inter-median from the first gamma value;
    a multi-threshold generation step, which uses the second primary index and the second sub-index to construct multiple thresholds; and
    a correction step, which compares the n-bit video signal with the thresholds for correcting the first gamma value and thus generating the gamma correction value.

2. The method as claimed in claim 1, wherein the first gamma construction step is implemented by a table lookup.

3. The method as claimed in claim 1, wherein the multi-threshold generation step is implemented by a table lookup.

4. The method as claimed in claim 1, wherein n equals to 16.

5. The method as claimed in claim 4, wherein when the value of the video signal is smaller than 8192, the first constant is 16 and the second constant is 0.

6. The method as claimed in claim 5, wherein when the value of the video signal is greater than or equal to 8192, the first constant is 64 and the second constant is 384.

7. The method as claimed in claim 1, wherein the third constant is 4.

8. The method as claimed in claim 1, wherein the fourth constant is 4.

9. A gamma correction method, which performs a gamma correction on an n-bit video signal to thus generate a gamma correction value, the method comprising the steps:
    (A) generating a virtual index by performing a first index mapping on a value of the n-bit video signal, and respectively generating a first primary index and a first sub-index by performing a second index mapping on the virtual index;
    (B) constructing a first gamma value with the first primary index and the first sub-index;
    (C) respectively generating a second primary index and a second sub-index by performing a third index mapping on the first gamma value;
    (D) constructing multiple thresholds with the second primary index and the second sub-index to construct; and
    (E) correcting the first gamma value by comparing the value of the n-bit video signal with the thresholds, thereby generating the gamma correction value.

10. The method as claimed in claim 9, wherein the step (B) is implemented by a table lookup.

11. The method as claimed in claim 9, wherein the step (D) is implemented by a table lookup.

12. The method as claimed in claim 9, wherein n equals to 16.

13. The method as claimed in claim 12, wherein the first index mapping divides the value of the n-bit video signal by a first constant, and accordingly performs a floor operation, and then adds a second constant, thereby obtaining the virtual index.

14. The method as claimed in claim 12, wherein the second index mapping divides the virtual index by a third constant, and accordingly performs the floor operation to thus obtain the first primary index, multiplies the first primary index by the third constant to thus generate a first inter-median, and subtracts the first inter-median from the virtual index to thus obtain the first sub-index.

15. The method as claimed in claim 12, wherein the third index mapping divides the first gamma value by a fourth constant and accordingly performs the floor operation to thus obtain the second primary index, multiplies the second primary index by the fourth constant to thus generate a second inter-median, and subtracts the second inter-median from the first gamma value to thus obtain the second sub-index.

16. A gamma correction system, which performs a gamma correction on an n-bit video signal to thus generate a gamma correction value, the system comprising:
    a first index generator, which has a first index mapping device and a second index mapping device such that the first index mapping device receives a value of the n-bit video signal to thus generate a virtual index, and the second index mapping device receives the virtual index to thus generate a first primary index and a first sub-index respectively;
    a first gamma generator, which is connected to the first index generator such that a first gamma value is constructed by the first primary index and the first sub-index;
    a second index generator, which is connected to the first gamma generator such that a second primary index and a second sub-index are respectively generated by performing an index mapping on the first gamma value;
    a multi-threshold generator, which is connected to the second index generator such that multiple thresholds are constructed by the second primary index and the second sub-index; and
    a correction device, which is connected to the first gamma generator and the multi-threshold generator such that the value of the n-bit video signal and the thresholds are compared to accordingly correct the first gamma value and generate the gamma correction value.

17. The system as claimed in claim 16, wherein the first gamma generator further includes a first lookup table such that the first gamma value is generated by looking up the first lookup table.

18. The system as claimed in claim 16, wherein the multi-threshold generator is a second lookup table such that the multiple thresholds are generated by looking up the second lookup table.

19. The system as claimed in claim 16, wherein n equals to 16.

20. The system as claimed in claim 19, wherein the first index mapping device divides the value of the n-bit video signal by a first constant and accordingly performs a floor operation, and then adds a second constant, thereby obtaining the virtual index.

21. The system as claimed in claim 19, wherein the second index mapping device divides the virtual index by a third constant and accordingly performs the floor operation to thus obtain the first primary index, multiplies the first primary index by the third constant to thus generate a first inter-median, and subtracts the first inter-median from the virtual index to thus obtain the first sub-index.

22. The system as claimed in claim 19, wherein the second index generator divides the first gamma value by a fourth constant and accordingly performs the floor operation to thus obtain the second primary index, multiplies the second primary index by the fourth constant to thus generate a second inter-median, and subtracts the second inter-median from the first gamma value to thus obtain the second sub-index.

* * * * *